Dec. 22, 1925.  G. W. LAUTRUP  1,566,485
BRAKE
Filed Dec. 15, 1923   2 Sheets-Sheet 1

Inventor
George W. Lautrup
By his Attorney
Walter E. F. Bradley

Dec. 22, 1925. 1,566,485
G. W. LAUTRUP
BRAKE
Filed Dec. 15, 1923 2 Sheets-Sheet 2

Patented Dec. 22, 1925.

1,566,485

UNITED STATES PATENT OFFICE.

GEORGE W. LAUTRUP, OF YONKERS, NEW YORK, ASSIGNOR TO OTIS ELEVATOR COMPANY, OF JERSEY CITY, NEW JERSEY, A CORPORATION OF NEW JERSEY.

BRAKE.

Application filed December 15, 1923. Serial No. 680,947.

*To all whom it may concern:*

Be it known that I, GEORGE W. LAUTRUP, a citizen of the United States, residing in Yonkers, in the county of Westchester and State of New York, have invented a new and useful Improvement in Brakes, of which the following is a specification.

My invention relates to brakes of the type in which a plurality of shoes are applied to a brake drum by one set of forces and released by an opposing force. More particularly my invention relates to multiple shoe brakes for elevator hoisting machines in which the brake is applied by springs or gravity and released electromagnetically.

One object of my invention is to equalize at all times, when the brake is applied, the pressure of the various shoes on the brake drum regardless of the adjustment of the applying means, and in the event of the failure of one of the applying means, to apply the remaining applying means equally through the various shoes.

Further objects of my invention are to provide a brake in which the kinetic energy imparted to the moving parts in the operation of the brake is small, in which lost motion is minimized and in which the fixed supports for the moving parts are kept as low as possible in the interest of mechanical strength, lightness and economy of space.

In the improved braking mechanism, I employ the principle of mechanically applying and magnetically releasing a plurality of braking units which interact to distribute the applying and releasing forces. I also prefer to provide a plurality of mechanical actuators, each applied to all of the braking units but capable of operation alone upon failure of the others.

One embodiment of my invention will be described in connection with the accompanying drawings, in which—

Similar numerals refer to similar parts throughout the several views.

The embodiment illustrated comprises two braking units similar in construction and symmetrically arranged with respect to a brake drum.

Figure 1:
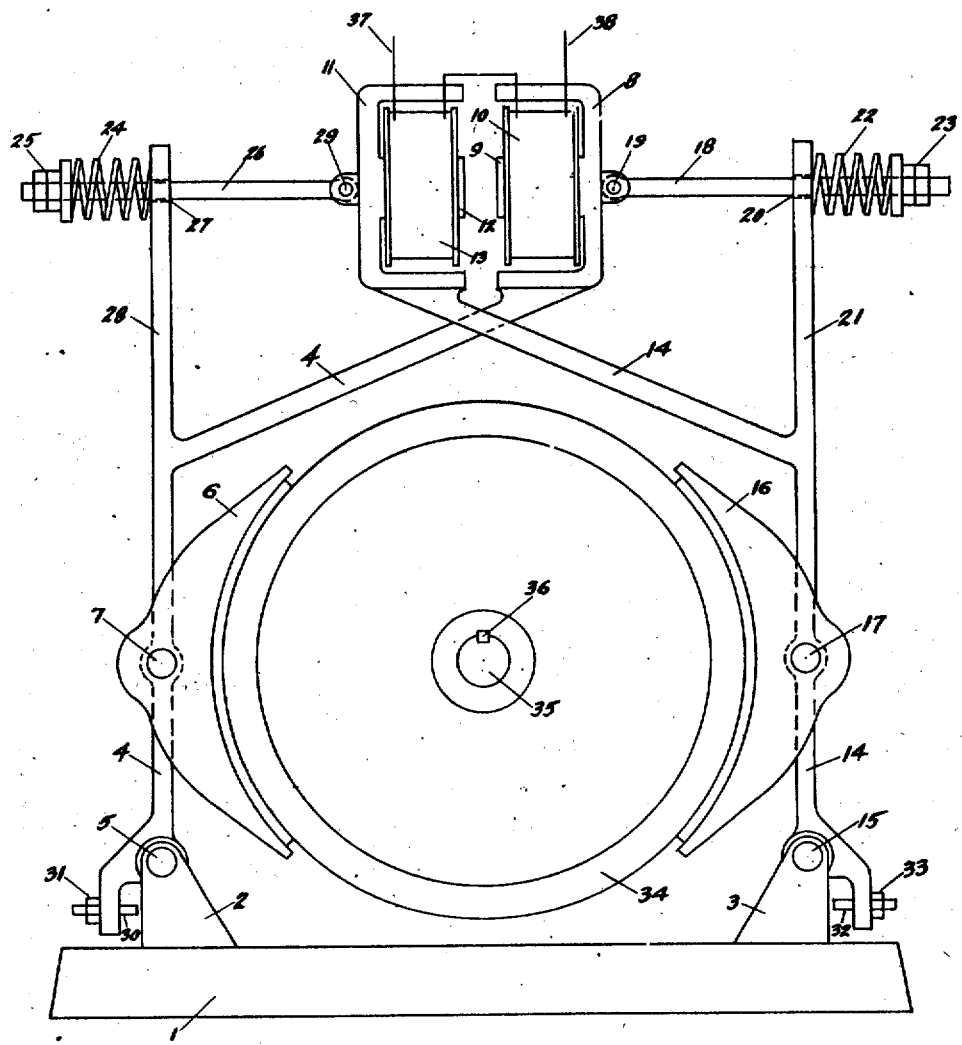
Figure 1 is a diagrammatic view showing the principles of construction of my brake.

Referring to Figure 1, brake arm 4 is pivotally supported on pin 5 in lug 2, which projects upwardly from base 1. Brake shoe 6 is pivotally secured to arm 4 by pin 7. Brake arm 4 extends across the top of brake drum 34 and at its upper end is brake magnet housing 8, which is provided with a core 9 and coil 10. In a similar manner brake magnet housing 11, core 12, coil 13, and brake shoe 16, with its pivot 17, are provided on brake arm 14, which is pivotally supported on pin 15 in lug 3. Rod 18 is pivotally connected to housing 8 by pin 19 and extends through opening 20 in extension 21 of brake arm 14 and has the actuating spring 22 secured by adjusting nuts 23 mounted on its outer end. Likewise actuating spring 24 is secured by adjusting nuts 25 over the outer end of rod 26, which passes through opening 27 in extension 28 of brake arm 4 and is pivotally connected to brake magnet housing 11 by pin 29. A stop 30 is adjustably mounted in the lower end of brake arm 4 and is held in place by nut 31. Likewise a stop 32 secured by nut 33 is provided in the lower end of brake arm 14. The brake shoes are adapted to engage the brake drum 34 when the brake is applied, this brake drum being secured to shaft 35 as by key 36. Current is supplied to the two brake magnet coils through leads 37 and 38. These brake magnet coils may be connected in series as shown or in parallel if desired.

When the coils of the brake magnet are energized, the cores 9 and 12 are attracted. The housings 8 and 11 move toward each other and, since they are transposed, a reversal of motion between these housings and the brake shoes 6 and 16 is brought about so that brake shoes 6 and 16 move apart. If the cores 9 and 12 with housings 8 and 11 move at the same time when the brake coils are energized, both shoes 6 and 16 are released from the brake drum 34 simultaneously. Under certain conditions, one core with its arm may move before the other and thereby release its brake shoe, while the other remains applied. In such event the stop 30 or 32, according to which arm has first moved, will come up against one of the lugs 2 or 3 and prevent further movement of this arm. Further movement of the cores toward each other will then result in movement of the other arm to release its brake shoe. By properly adjusting the stops 30 and 32, the lifting of both shoes from the brake drum is ensured whenever the brake coils are energized.

It is to be noted that when the coils are deenergized spring 24 acts to apply both shoes 6 and 16 to brake drum 34 with equal pressure; also that spring 22 acts similarly to but independently of spring 24. Thus, no matter whether springs 22 and 24 are adjusted to the same pressure or different pressures, brake shoes 6 and 16 will always bear equally on brake drum 34, with a pressure corresponding to the sum of the pressures of the two springs. This equalization of pressure of the brake shoes on the drum is of advantage in that it distributes the wear equally among the brake shoes and prevents side pressure on the shaft to which the brake drum is secured.

Due to the small number of pivot points in my brake, the lost motion in the moving parts is very small. Consequently, I am able to use a small air gap between the cores, and this permits of the coils and cores being small and of light weight. The resulting small motion and low inertia of the moving parts ensures a minimum of slamming of the cores when the brake is released, a smooth application of the shoes when the brake is applied, and quick action in both releasing and applying.

Figure 3:
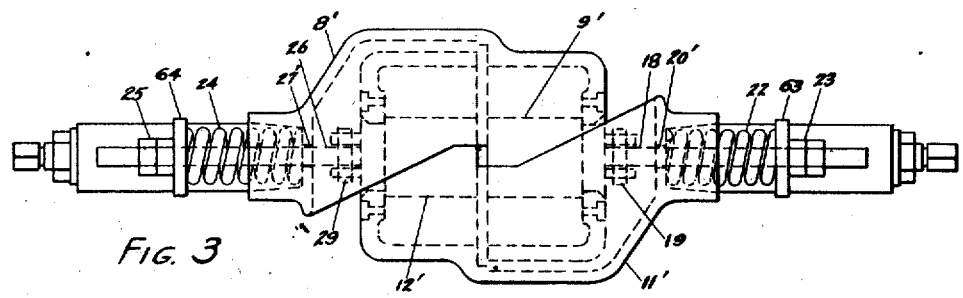
Figure 3 is a plan view of the brake shown in Figure 2.
Figure 2:
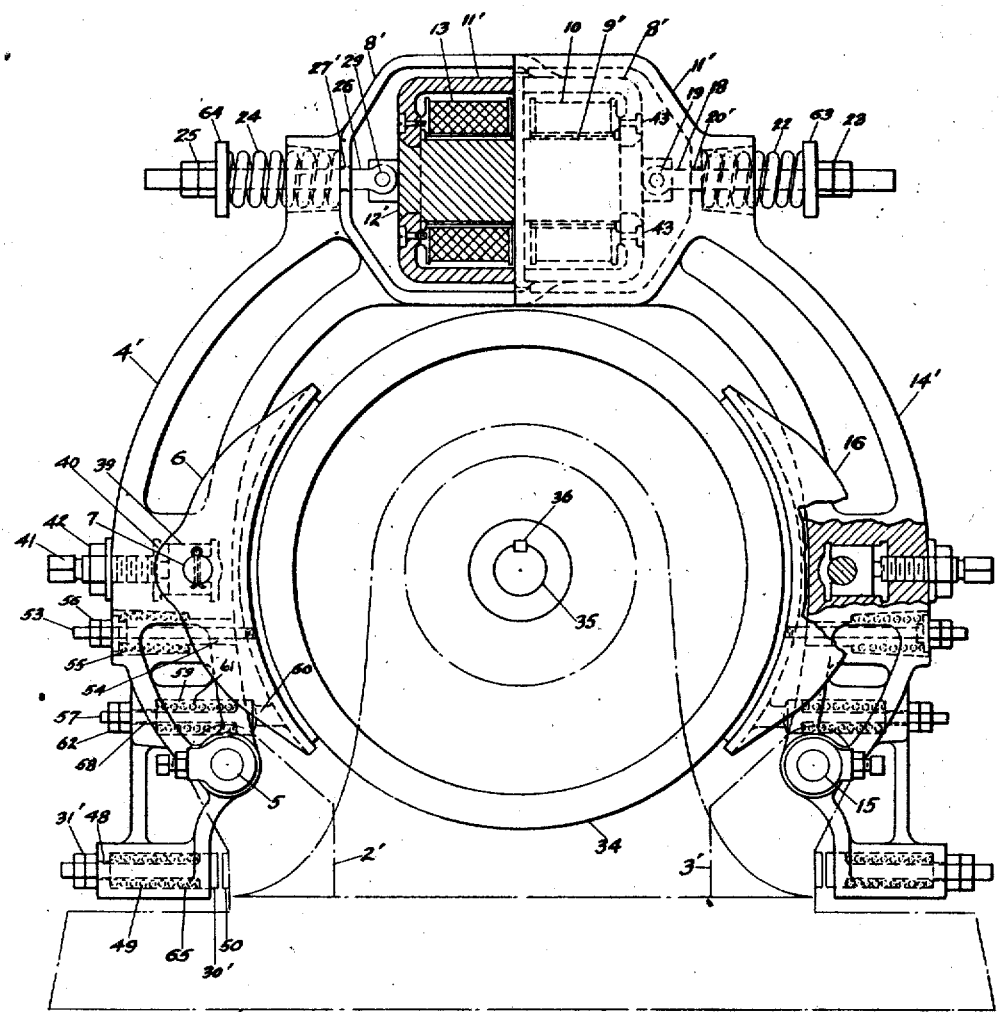
Figure 2 is a side elevation of an electromagnetically released, spring applied brake embodying my invention, with parts cut away showing other parts in section.

Figures 2 and 3 show details of construction of a brake embodying the principles described in connection with Figure 1, and will be described together.

Base 1 carries lugs 2' and 3'. Brake arm 4' is pivotally mounted on pin 5 in lug 2'. Brake shoe 6 is adapted to pivot about pin 7 in block 39, the latter being mounted in recess 40 in brake arm 4' for adjustment in a direction perpendicular to the axis of the brake drum by means of screw 41 and nut 42. To keep the brake shoe concentric with the drum when the brake is released, so that no part of the brake shoe will drag, and also to prevent lost motion between the brake shoe and brake arm, I provide an adjustable, resiliently yielding abutment on the brake arm for the brake shoe. Between this abutment and the pivoted point of the brake shoe, I provide resilient means for holding the brake shoe in engagement with the abutment and for maintaining a pressure between the parts of the pivotal mounting of the brake shoe, which pressure acts in the same direction as the pressure exerted when the brake is applied. Thus in the case of brake shoe 6, a rod 53 is rigidly fastened in shoe 6 and extends through opening 54 in brake arm 4'. Spring 55 over rod 53 with nuts 56 on rod 53 forms a resilient connection between the brake shoe 6 and the brake arm 4' tending to pull the lower part of the brake shoe away from the drum 34. Another rod 57 with its spring 61 extends through opening 58 and recess 59 in brake arm 4' and serves as an abutment for lug 60 on brake shoe 6. Nuts 62 on rod 57 hold the rod against the pressure of spring 61 and are adjusted to vary the compression of the spring as desired.

It will be noted that rods 53 and 57 are so located with respect to pivot pin 7 that the pressure exerted by spring 55 acts to push the brake shoe 6, pin 7, and block 39 outwardly from shaft 35, rod 57 serving as an abutment for the brake shoe. Since the pressure on the pivot 7 when the brake is applied is also outward from the shaft 35, the brake shoe 6 and brake arm 4' will remain in the same relative positions at all times irrespective of lost motion in the pivotal mounting. Brake shoe 16 is similarly mounted on brake arm 14'.

Brake magnet housing 8' is integral with brake arm 4'. Core 9' is secured within the housing 8' as by riveting its end. Coil 10 surrounds core 9' and is fastened to housing 8' as by screws 43. Similarly core 12' and coil 13 are assembled in brake magnet housing 11', which forms part of brake arm 14'.

Rod 18 is pivotally connected to core 9' by pin 19 and extends through opening 20' in housing 11'. Adjusting nuts 23 and collar 63 are provided at the end of rod 18 and compression spring 22 is interposed between collar 63 and brake magnet housing 11'. Likewise a rod 26, having adjusting nuts 25 and collar 64, is pivotally attached by pin 29 to core 12' and extends through opening 27' in housing 8'. Spring 24 surrounds rod 26 between collar 64 and housing 8'. It will be observed that each of the actuator springs 22 and 24 acts independently to clamp both brake shoes on brake drum 34 with a pressure corresponding to its strength. The total pressure, therefore, with which the brake shoes are applied, is the sum of the pressures developed by both springs 22 and 24 and transmitted through brake arms 4' and 14'. Due to springs 22 and 24 being interposed between the brake arms 4' and 14', the pressure with which the brake shoes 6 and 16 are applied is equally divided between the brake shoes.

Brake arm 4' is provided on its lower end with a resilient stop consisting of pin 30' adapted for movement in recess 65 and extending through opening 48 in brake arm 4'. Spring 49 surrounds pin 30' in recess 65. Nuts 31' permit of adjusting the position of pin 30' with respect to boss 50 on lug 2'. A similar stop is provided at the lower end of brake arm 14'. When one of the brake arms has released its brake shoe ahead of the other, its stop arrests its movement at the limit to which it is adjusted and thereafter the full force of the magnet is thus applied to the movement of the other arm.

The operation of the brake is similar to that outlined in connection with the diagrammatic view in Figure 1. When the brake magnet coils are energized, cores 9' and 12' are attracted and relative motion between the brake arms 4' and 14' follows. Both arms may move at the same time to release brake shoes 6 and 16 or one may move until its resilient stop engages its corresponding boss, whereupon the other arm moves. This results in the releasing of both shoes clear of the brake drum, by the time cores 9' and 12' come together.

I desire to have the lower ends of the brake arms pivotally supported close to the base plate and to apply the actuating forces to their upper ends, while supporting the brake shoes on pivots at points between the upper and lower ends of the arms. By this arrangement the brake arms act as levers of the second order in both the application and release of the brake shoes. By crossing the upper ends of the brake arms, I am enabled to utilize the construction desired and at the same time rigidly attach the magnet cores to the upper ends of the arms and obtain the releasing of the brake shoes as the magnet cores move toward each other. By this construction I minimize the number of joints, which are always subject to wear and lost motion. Furthermore, by the resilient mounting of the brake shoes on the brake arms, I eliminate lost motion at these points. The only points at which lost motion can occur are the pivots 5 and 15, which may be made of liberal dimensions to decrease the wear. The small amount of lost motion makes possible a very small movement of the parts of the brake to free the shoes from the brake drum. This small movement in turn, permits of releasing and applying the brake quickly without imparting any great amount of kinetic energy to its moving parts. The result of this is smooth action without slamming. Furthermore, since the pressure on the brake drum is at all times equally divided among the various shoes, the brake shoe linings wear equally and the shaft on which the brake drum is mounted is not subjected to side thrusts.

I claim:

1. Braking mechanism comprising in combination a brake drum, a pair of brake arms, a brake shoe carried by each arm between its ends to cooperate with said brake drum, a pivotal support for each arm at one end and a magnet coil and core rigidly mounted on the other end of each arm for drawing them toward each other and releasing said shoes from said drum.

2. A mechanically applied, magnetically released braking mechanism, comprising in combination a brake drum, a pair of brake arms each pivotally supported at one end and crossing the other at its other end, brake shoes suitably supported at intermediate portions of said arms, to be applied to said brake drum, mechanical actuators interconnecting the free ends of said arms and each constantly tending to move the brake shoes into contact with said brake drum regardless of the other, and electromagnetic actuating means for drawing the crossed free ends of said arms toward each other against the force of said mechanical actuators, to release said brake shoes from said brake drum.

3. A magnetically released, mechanically applied braking mechanism comprising in combination a pair of pivotally supported brake arms, brake shoes carried thereby, a brake drum to which said shoes may be applied, yielding mechanical actuating means tending to apply said shoes to said drum, and a magnet coil and core on the free end of each of said arms, those of one arm being magnetically related to those of the other for mutual attraction and transposed to cause the portions of the arm carrying the shoes to move away from each other and release the brake shoes.

In testimony whereof, I have signed my name to this specification.

GEORGE W. LAUTRUP.

the full force of the magnet is thus applied to the movement of the other arm.

The operation of the brake is similar to that outlined in connection with the diagramatic view in Figure 1. When the brake magnet coils are energized, cores 9' and 12' are attracted and relative motion between the brake arms 4' and 14' follows. Both arms may move at the same time to release brake shoes 6 and 16 or one may move until its resilient stop engages its corresponding boss, whereupon the other arm moves. This results in the releasing of both shoes clear of the brake drum, by the time cores 9' and 12' come together.

I desire to have the lower ends of the brake arms pivotally supported close to the base plate and to apply the actuating forces to their upper ends, while supporting the brake shoes on pivots at points between the upper and lower ends of the arms. By this arrangement the brake arms act as levers of the second order in both the application and release of the brake shoes. By crossing the upper ends of the brake arms, I am enabled to utilize the construction desired and at the same time rigidly attach the magnet cores to the upper ends of the arms and obtain the releasing of the brake shoes as the magnet cores move toward each other. By this construction I minimize the number of joints, which are always subject to wear and lost motion. Furthermore, by the resilient mounting of the brake shoes on the brake arms, I eliminate lost motion at these points. The only points at which lost motion can occur are the pivots 5 and 15, which may be made of liberal dimensions to decrease the wear. The small amount of lost motion makes possible a very small movement of the parts of the brake to free the shoes from the brake drum. This small movement in turn, permits of releasing and applying the brake quickly without imparting any great amount of kinetic energy to its moving parts. The result of this is smooth action without slamming. Furthermore, since the pressure on the brake drum is at all times equally divided among the various shoes, the brake shoe linings wear equally and the shaft on which the brake drum is mounted is not subjected to side thrusts.

I claim:

1. Braking mechanism comprising in combination a brake drum, a pair of brake arms, a brake shoe carried by each arm between its ends to cooperate with said brake drum, a pivotal support for each arm at one end and a magnet coil and core rigidly mounted on the other end of each arm for drawing them toward each other and releasing said shoes from said drum.

2. A mechanically applied, magnetically released braking mechanism, comprising in combination a brake drum, a pair of brake arms each pivotally supported at one end and crossing the other at its other end, brake shoes suitably supported at intermediate portions of said arms, to be applied to said brake drum, mechanical actuators interconnecting the free ends of said arms and each constantly tending to move the brake shoes into contact with said brake drum regardless of the other, and electromagnetic actuating means for drawing the crossed free ends of said arms toward each other against the force of said mechanical actuators, to release said brake shoes from said brake drum.

3. A magnetically released, mechanically applied braking mechanism comprising in combination a pair of pivotally supported brake arms, brake shoes carried thereby, a brake drum to which said shoes may be applied, yielding mechanical actuating means tending to apply said shoes to said drum, and a magnet coil and core on the free end of each of said arms, those of one arm being magnetically related to those of the other for mutual attraction and transposed to cause the portions of the arm carrying the shoes to move away from each other and release the brake shoes.

In testimony whereof, I have signed my name to this specification.

GEORGE W. LAUTRUP.

Certificate of Correction.

It is hereby certified that in Letters Patent No. 1,566,485, granted December 22, 1925, upon the application of George W. Lautrup, of Yonkers, New York, for an improvement in "Brakes," errors appear in the printed specification requiring correction as follows: Page 3, line 60, claim 1, strike out the word "them" and insert instead *said other ends;* same page, line 90, claim 3, for the word "arm" read *arms;* and that the said Letters Patent should be read with these corrections therein that the same may conform to the record of the case in the Patent Office.

Signed and sealed this 9th day of March, A. D. 1926.

[SEAL.]

M. J. MOORE,
*Acting Commissioner of Patents.*

Certificate of Correction.

It is hereby certified that in Letters Patent No. 1,566,485, granted December 22, 1925, upon the application of George W. Lautrup, of Yonkers, New York, for an improvement in "Brakes," errors appear in the printed specification requiring correction as follows: Page 3, line 60, claim 1, strike out the word "them" and insert instead *said other ends;* same page, line 90, claim 3, for the word "arm" read *arms;* and that the said Letters Patent should be read with these corrections therein that the same may conform to the record of the case in the Patent Office.

Signed and sealed this 9th day of March, A. D. 1926.

[SEAL.]

M. J. MOORE,
*Acting Commissioner of Patents.*